United States Patent [19]

Chen et al.

[11] Patent Number: 5,347,376
[45] Date of Patent: Sep. 13, 1994

[54] METHOD AND APPARATUS FOR PRODUCING A HOLOGRAPHIC SHADOWGRAM

[75] Inventors: Hsuan S. Chen, Midland; Gregory A. Wright, Saginaw, both of Mich.

[73] Assignee: Saginaw Valley State University, Saginaw, Mich.

[21] Appl. No.: 14,105

[22] Filed: Feb. 5, 1993

[51] Int. Cl.⁵ .................. G03H 1/04; G03H 1/02
[52] U.S. Cl. ...................... 359/28; 359/30; 359/34
[58] Field of Search .............. 359/27, 28, 29, 30, 359/35, 3

[56] References Cited

U.S. PATENT DOCUMENTS

| | | | |
|---|---|---|---|
| 3,578,837 | 5/1971 | Brooks | 359/28 |
| 3,598,467 | 8/1971 | Pearson | 359/28 |
| 3,674,331 | 7/1972 | Caulfield | 359/28 |
| 3,677,616 | 7/1972 | Lewis | 359/28 |
| 3,680,944 | 8/1972 | Ernst et al. | 359/28 |
| 3,692,380 | 9/1972 | Inagaki | 359/28 |
| 3,692,381 | 9/1972 | Champagne . | |
| 4,278,319 | 7/1981 | Timkóborn Józsa et al. . | |
| 4,566,757 | 1/1986 | Fusek et al. . | |
| 4,603,937 | 8/1986 | Copp . | |
| 5,117,296 | 5/1992 | Hoebing . | |

OTHER PUBLICATIONS

Hsuan Chen and Paul H. Ruterbusch, Single Beam Holography, Am. J. Phys. vol. 47, No. 12, Dec. 1979, pp. 1042–1044.
Journal of the Optical Society of America, vol. 54, No. 11, Nov. 1964, Emmett N. Leith and Juris Upatnieks, pp. 1295–1301.

*Primary Examiner*—Martin Lerner
*Attorney, Agent, or Firm*—Brooks & Kushman

[57] ABSTRACT

A method and apparatus for making a holographic shadowgram of an object are disclosed. The method and apparatus include a light source for generating and expanding a coherent light beam. The method and apparatus also include a reflector for reflecting the coherent light beam to simultaneously produce a diffuse object beam and a coherent reference beam such that differential vibration between the object and reference beams is substantially eliminated, and for illuminating the object with the object beam and creating an interference pattern between the object and reference beams. The method and apparatus further include a recorder for recording the interference pattern to produce the holographic shadowgram.

14 Claims, 3 Drawing Sheets

METHOD AND APPARATUS FOR PRODUCING A HOLOGRAPHIC SHADOWGRAM

TECHNICAL FIELD

This invention relates generally to a method and apparatus for holographic imagery. More specifically, this invention relates to a method and apparatus for producing a holographic shadowgram.

BACKGROUND TO THE INVENTION

First discovered in the late 1940's, holography is a method of optical imagery similar in some respects to photography. With the advent of the laser as a coherent light source, a wide variety of practical uses for holography have been developed since the early 1960's.

While similar in some respects, photography and holography are fundamentally different. Unlike photography, which produces a two-dimensional image of an object by recording the irradiance distribution of light reflected by the object, holography produces a three-dimensional image of an object by recording a wavefront of light emanating from the object.

Typically, this object wave is recorded in such a way that subsequent illumination of the record can reconstruct the original object wave. Visual observation of the reconstructed wavefront then yields a three-dimensional view of the object that is virtually indistinguishable from the original.

A hologram is generally produced from an expanded coherent light beam that is split into two components. One component is directed toward an object and is referred to as the illuminating, or object beam. The other component is directed toward a recording medium and is referred to as the coding, or reference beam. Typically, the object beam is reflected off the object toward the recording medium. Since the object and reference beams originate from the same source, they are mutually coherent and their interference forms a stable pattern when they meet at the recording medium. The record of the interference pattern of the object and reference beams constitutes a hologram.

Conventional holographic imaging systems have been modified over the years in a number of different fashions. For example, an object may be illuminated from behind by the object beam. Such a technique produces a holographic "shadowgram" and was disclosed in "Wavefront Reconstruction with Diffused Illumination and Three-Dimensional Objects" by E. Leith and J. Upatnieks in the Journal of the Optical Society of America, Vol. 54, No. 11, Nov. 1964. Moreover, single beam holographic imaging systems have also been developed, such as those disclosed in "Single Beam Holography" by H. Chen and P. Ruterbusch in the American Journal of Physics, Vol. 47, No. 12, Dec. 1979.

The typical holographic imaging systems described above, however, suffer from various problems. The most troublesome of such problems is that the object being recorded must remain perfectly still to within a fraction of a micrometer and must be devoid of any minute vibration during the period of recording. More specifically, when the coherent light beam is split in conventional holographic imaging systems, there is a potential for undesirable differential fringe vibration of the interference pattern between the resultant object and reference beams. Any motion or vibration in the object or optical component creates a differential vibration, or optical path difference, between the object beam and the reference beam. Such a change in the optical path difference of the object and reference beams destabilizes the interference pattern between the beams thereby undermining the effectiveness of the resultant hologram. These stringent motion and vibration requirements have thus ruled out the use of human or other live specimen as the holographic object in conventional holographic imaging systems.

The stringent motion and vibration requirements of conventional holographic imaging systems also create a variety of secondary problems. To reduce vibration problems, expensive precision components are required, including large vibration isolated optical tables. The motion and vibration problems of typical holographic imaging systems can be reduced through the use of single beam techniques, or virtually eliminated through the use of pulse lasers. However, known single beam techniques cannot easily and sufficiently eliminate motion and vibration problems, and pulse lasers significantly increase the cost of holographic imaging systems. Moreover, with either conventional or pulse laser holographic imaging systems, the holographic recording process is a sophisticated technique that can only be carried out by skilled technicians in a well equipped laboratory.

The conventional and pulse laser holographic imaging systems described above, and their various applications, are exemplified by U.S. Pat. Nos. 3,692,381 to Champagne; 4,278,319 to Jozsa et al; 4,566,757 to Fusek et al; 4,603,937 to Copp; and 5,177,296 to Hoebing. Each of these patents, however, disclose holographic imaging systems that suffer from the problems discussed above, such as differential vibration between the object and reference beams, or significant expense.

SUMMARY OF THE INVENTION

Accordingly, it is the principle object of this invention to provide a method and apparatus for producing a holographic shadowgram of an object, where such method and apparatus substantially eliminate differential vibration between an object beam and a reference beam.

Another object of this invention is to provide a method and apparatus for producing a holographic shadowgram of an object, where such method and apparatus allow holographic imaging of living subjects.

Yet another object of this invention is to provide a method and apparatus for producing a holographic shadowgram of an object, where such method and apparatus are simple in design and inexpensive to implement.

In accordance with the foregoing objects, a method and apparatus for producing a holographic shadowgram of an object are disclosed. The apparatus of the present invention comprises light source means for generating and expanding a coherent light beam. The apparatus also comprises reflector means for reflecting the coherent light beam to simultaneously produce a diffuse object beam and a coherent reference beam such that differential vibration between the object and reference beams is substantially eliminated, and for back illuminating the object with the object beam such that the object and reference beams create an interference pattern. The apparatus further comprises recorder means for recording the interference pattern of the object and reference beams to produce the holographic shadowgram.

The method of the present invention comprises the steps of generating and expanding a coherent light beam. The method also comprises the steps of reflecting the coherent light beam to simultaneously produce a diffuse object beam and a coherent reference beam such that differential vibration between the object and reference beams is substantially eliminated, and back illuminating the object with the diffuse object beam. The method further comprises the steps of creating a substantially stable interference pattern between the object and reference beams and recording the interference pattern between the object and reference beam to produce the holographic shadowgram.

DETAILED DESCRIPTION OF THE INVENTION

Figure 1:
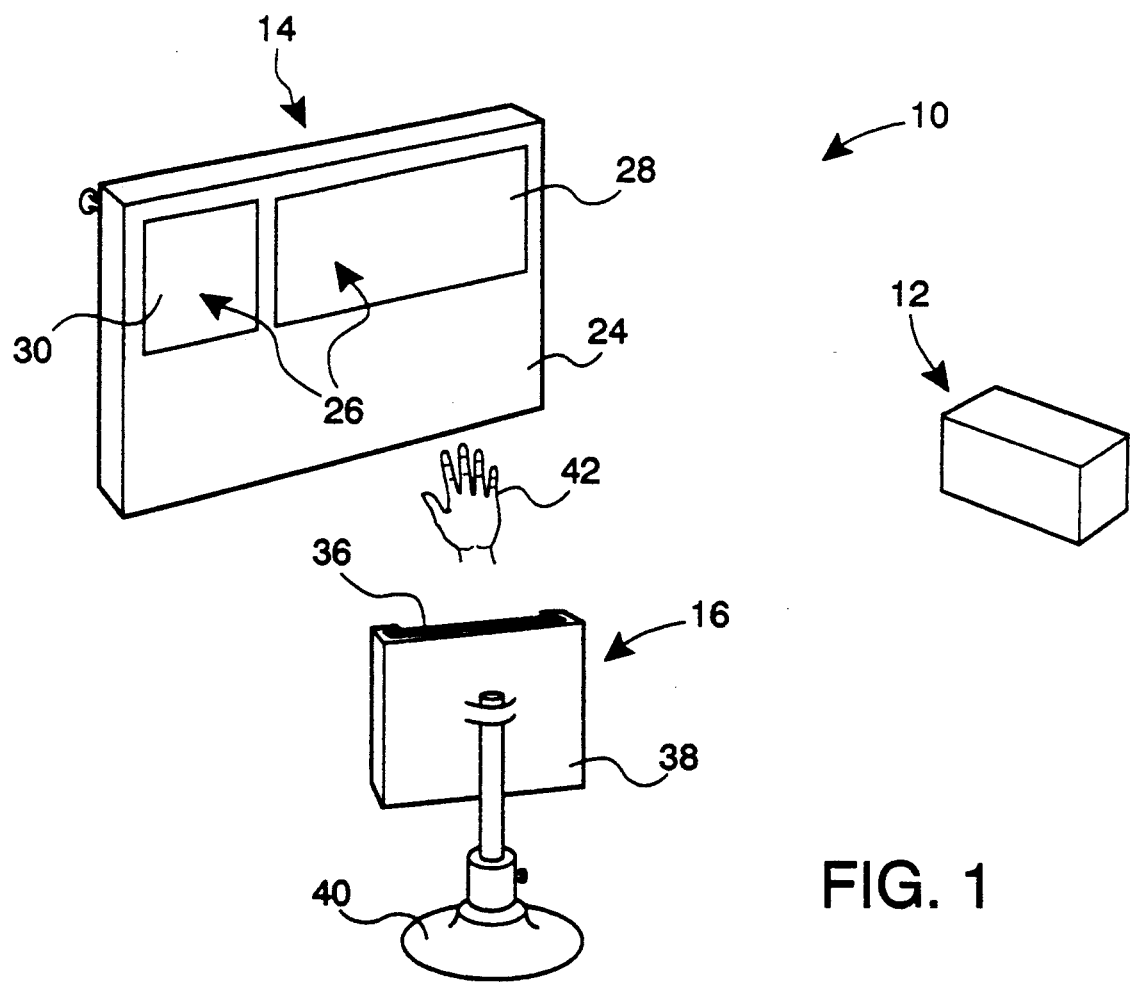
FIG. 1 is a perspective view of the apparatus for producing a holographic shadowgram of the present invention.
Figure 2:
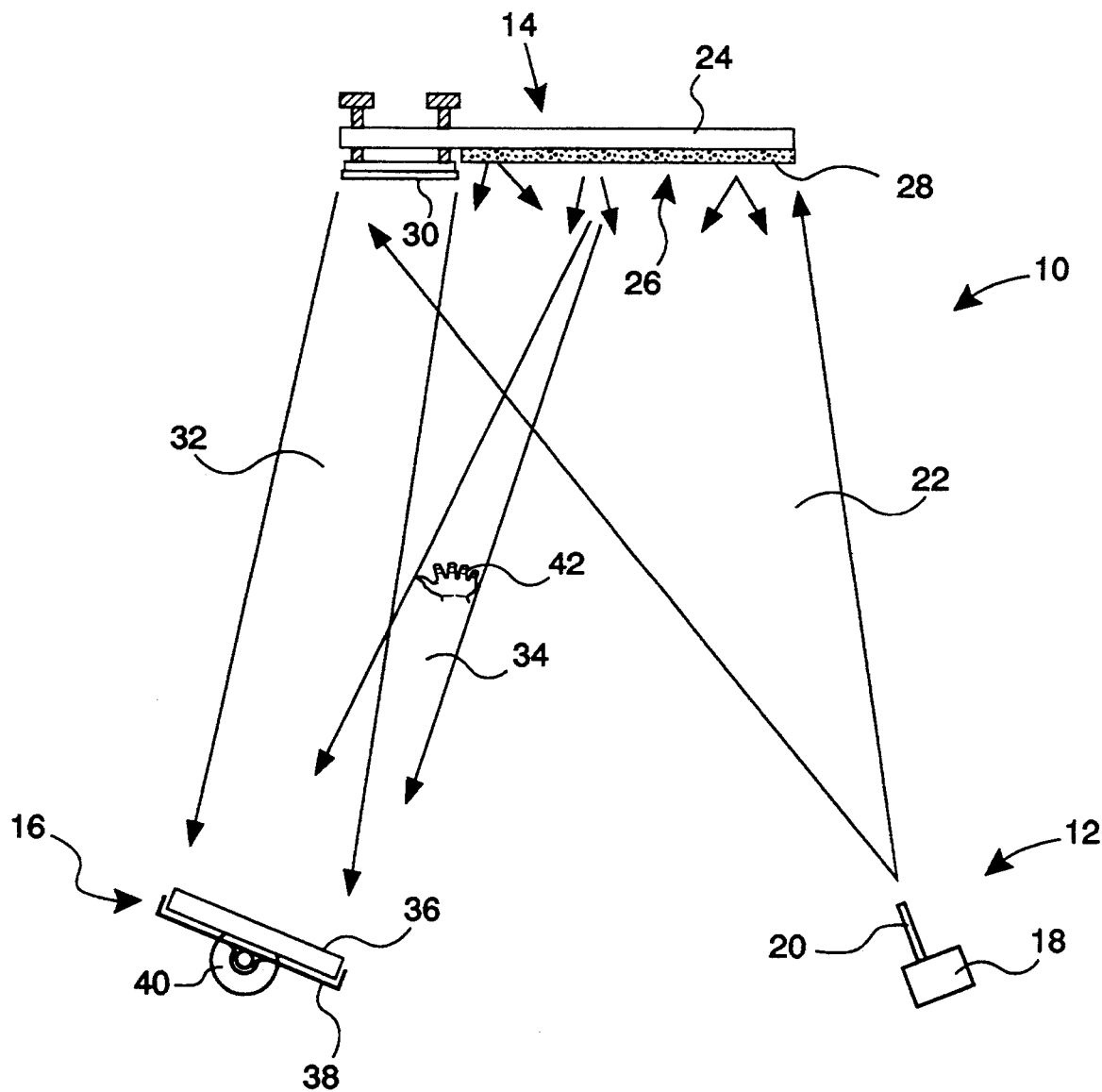
FIG. 2 is a top view of the apparatus for producing a holographic shadowgram of the present invention.

Referring now to FIGS. 1 and 2, the apparatus for producing a holographic shadowgram of the present invention is indicated generally by reference numeral 10. The apparatus 10 includes a light source 12, reflector 14 and recorder 16.

Light source 12 includes a laser 18 and a beam expander 20. The laser 18 generates coherent light and is preferably a single mode laser diode or CW gas laser, both well known in the art. Beam expander 20 expands the coherent light generated by the laser 18 and removes unwanted noise from the coherent light. Beam expander 20 is shown in FIG. 2 as a conventional optical fiber, but other expanders may be used, such as a diverging or collimating lens. As will be described in greater detail below, the laser 18 and beam expander 20 together provide a light source means for generating a coherent light beam 22.

The apparatus 10 of the present invention also includes a reflector 14. Reflector 14 comprises a rigid board 24 having a reflective surface 26. Reflective surface 26 is divided into a diffuse portion 28 and a non-diffuse portion 30. As will be described in greater detail below, non-diffuse portion 30 of the reflective surface 26 serves to reflect the coherent light beam 22 to produce a coherent reference beam 32. Accordingly, non-diffuse portion 30 should be a reflective media that substantially maintains the specular properties of the coherent light beam 22. For these purposes, as shown in FIGS. 1 and 2, non-diffuse portion 30 is preferably a mirror or other similar reflective surface.

As will also be described in greater detail below, diffuse portion 28 of the reflective surface 26 serves to reflect the coherent light beam 22 to produce a diffuse object beam 34. Accordingly, diffuse portion 28 should be a reflective media that broadly and finely diffuses the coherent light beam 22. For these purposes, diffuse portion 28 is preferably constructed from finish cut lumber having a flat white spray painted surface, conventional construction dry wall, or other suitable material.

For maximum utility, ease of handling, and portability, reflector 14 can be made as small as an ordinary briefcase. Alternatively, reflector 14 may be foldable to such a small size. If foldable, however, the reflector 14 should be rigid when erected. Again, as will be described in further detail below, the board 24, reflective surface 26 and its diffuse and non-diffuse portions 28, 30 together provide reflector means for reflecting the coherent light beam 22 from light source 12 to simultaneously produce a diffuse object beam 34 and a coherent reference beam 32.

Still referring to FIGS. 1 and 2, the apparatus 10 of the present invention also includes a recorder 16. Recorder 16 comprises a photographic or holographic plate having a conventional recording medium 36, such as a photographic emulsion or photopolymer, and a plate holder 38. Holder 38 is preferably adjustable to change the height of the recording medium 36. For maximum stability, holder 38 is also preferably provided with a stable stand 40, such as a conventional optical stand or tripod. Once again, as will be described in greater detail below, the recording medium 36, holder 38 and stand 40 together provide recorder means for recording the interference pattern of the reference beam 32 and object beam 34 produced by the reflector 14.

As with reflector 14, light source 12 and recorder 16 may also be relatively small components. In such a manner, the entire apparatus 10 of the present invention can be enclosed within a small container having a size such as that of an ordinary briefcase, thereby maximizing its utility and portability.

Referring now to FIG. 2, in operation, the apparatus 10 of the present invention produces a holographic shadowgram as follows. Laser 18 of the light source 12 generates coherent light that is routed through beam expander 20. Beam expander 20 expands and removes noise from the coherent light of laser 18 to produce a divergent coherent light beam 22. Coherent light beam 22 is also directed generally towards reflector 14.

Coherent light beam 22 is then reflected by the reflective surface 26 of reflector 14. The diffuse portion 28 of the reflective surface 26 reflects the coherent light beam 22 to produce a diffuse object beam 34. Simultaneously, the non-diffuse portion 30 of the reflective surface 26 reflects the coherent light beam 22 to produce a coherent reference beam 32. Because diffuse and non-diffuse portions 28, 30 are both part of rigid board 24, there is substantially no differential vibration between the reference and object beams 32, 34 when they are simultaneously produced by the reflection of coherent light beam 22 by reflector 14. That is, the reference and object beams are both reflected and scattered, respectively, by the same rigid board from which the two beams vibrate in synchronization, resulting in minimal optical path difference variation between the beams during exposure of the object. As a result, the effect of vibration on the fringes formed by the interference between the reference beam and the back eliminating diffuse object beam at the recording medium is minimized.

As shown in FIG. 2, an object 42, which may be opaque, translucent, or transparent, is positioned in the path of the object beam 34. In such a manner, the object 42 is "back illuminated" by the object beam 34. That is, the object beam 34 may be incident upon the object 42 at any angle, so long as the reflector 14, the source of the object beam 34, is generally behind the object 42. Indeed, the object 42 may even be positioned in physical contact with the diffuse portion 28 of the reflective surface 26 of the reflector 14. Nevertheless, it is preferred, but not essential, that object 42 be positioned outside the paths of both the coherent light beam 22 and the reference beam 32. Moreover, for the most effective operation of the apparatus 10 of the present invention, the object 42 is preferably physically detached from the optics of the reference and object beams 32, 34, the reflector 14, and the recorder 16.

As in conventional holographic imaging systems, after the object beam 34 illuminates the object 42, the object beam 34 then interferes with the reference beam 32. Via its holder 38 and stand 40, the recorder 16 is positioned such that the pattern created by the interference of the reference and object beams 32, 34 is recorded on the recording medium 36. The exposure time of the recording medium 36 to the interference pattern of the reference and object beams 32, 34 necessary to create the holographic shadowgram is comparable to that of an ordinary photograph. It is this interference pattern recorded on the recording medium 36 that creates the holographic shadowgram.

As previously described, with the apparatus 10 of the present invention, there is substantially no differential vibration between the reference and object beams 32, 34. Such is the case even where there exists substantial variation in the overall irradiance impinging on the recording medium 36 during the course of its exposure to the reference and object beams 32, 34. As a result, the fringes of the interference pattern from the reference and object beams 32, 34 will remain substantially stable, allowing for the recording of that interference pattern in the conventional manner on the recording medium 36 of the recorder 16.

Moreover, the interference pattern formed by the reference and object beams produced by the apparatus 10 of the present invention remains stable whether or not the object 42 is vibration isolated or devoid of any motion. This is because the object, when position between the board and the recording medium, does not change the corresponding phase relationship between the reference and object beams emanating synchronously from the board. Thus, unlike conventional holographic imaging systems, the apparatus 10 of the present invention allows for holographic imaging of the object 42 even where the object 42 is in motion, without the use of expensive pulse lasers. As a result, even living subjects, or any portions thereof, may serve as the object 42 to be holographically recorded. To demonstrate this point, object 42 is shown in FIGS. 1 and 2 as a human hand.

With the apparatus 10 of the present invention, the interference pattern of the reference and object beams 32, 34 is modified by the intervening object 42. For example, where the object 42 is opaque, the speckle pattern formed by the object beam 34 is modified by the removal of a portion of the object beam 34. It is this removal of a portion of the object beam 34 that results in the creation of a holographic "shadowgram" The speckle pattern formed by the object beam 34 is also modified where the object 42 is translucent or transparent. In such cases, however, the change in the speckle pattern is caused by the index modulation, such as attenuation, of the object beam 34, rather than removal of the object beam 34.

Figure 3:
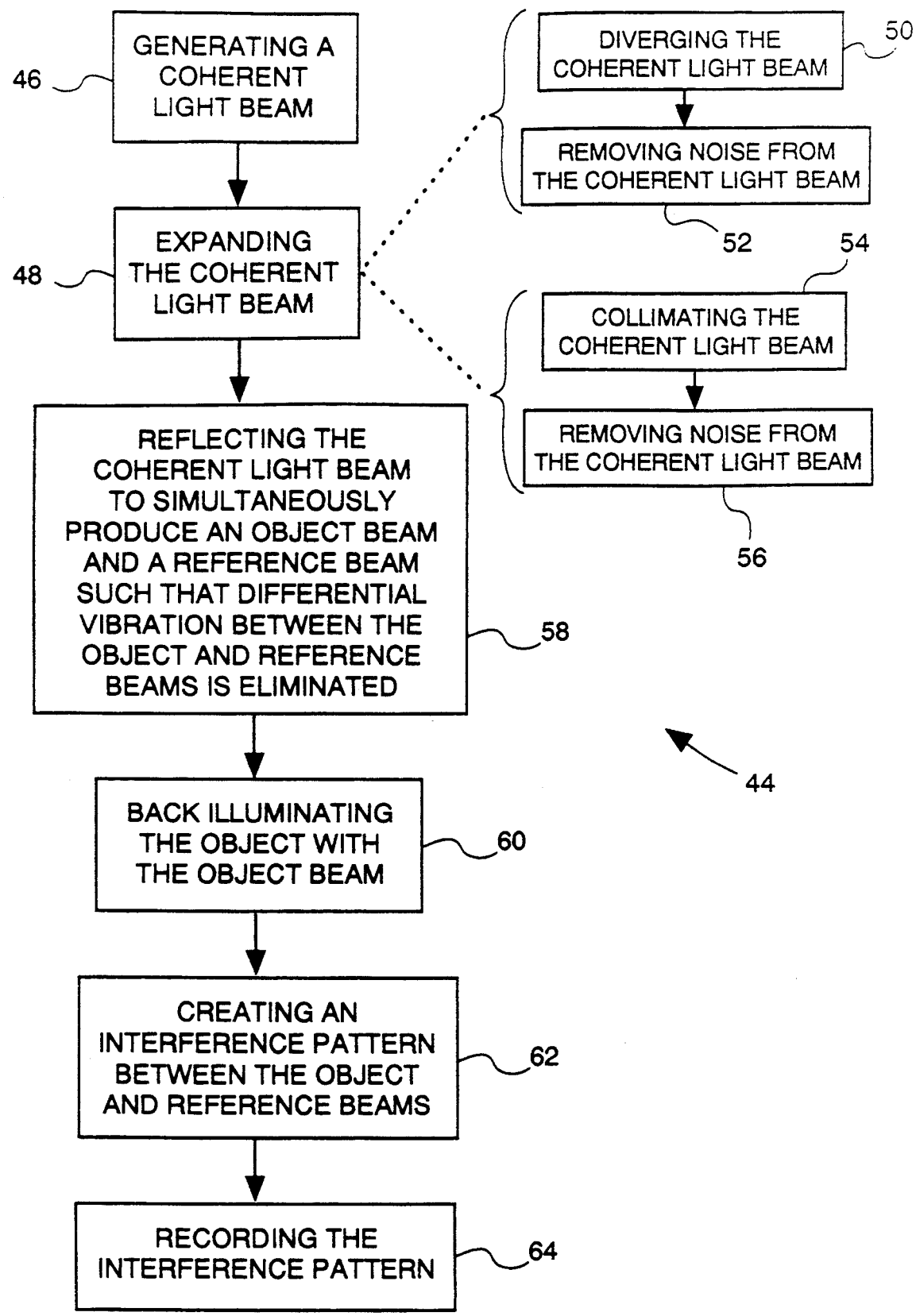
FIG. 3 is a block diagram of the method for producing a holographic shadowgram of the present invention.

Referring now to FIG. 3, the method for producing a holographic shadowgram of an object is shown in block diagram form and indicated generally by reference numeral 44. As previously discussed in detail above with respect to the apparatus 10 of the present invention, the method 44 comprises the steps of generating 46 and expanding 48 a coherent light beam 22. The step of expanding 48 the coherent light beam 22 itself further comprises the steps of diverging 50 the coherent light beam 22, and removing 52 noise from the coherent light beam 22. Alternatively, the step of expanding 48 the coherent light beam 22 may comprise the steps of collimating 54 the coherent light beam 22, and removing 56 noise from the coherent light beam 22.

The method 44 of the present invention also comprises the step of reflecting 58 the coherent light beam 22 to simultaneously produce a coherent reference beam 32 and a diffuse object beam 34 such that differential vibration between the reference and object beams 32, 34 is substantially eliminated, and back illuminating 60 an object 42 with the diffuse object beam 34. The method 44 further comprises the steps of creating 62 an interference pattern between the reference and object beams 32, 34, and recording 64 the interference pattern between the reference and object beams 32, 34 to produce the holographic shadowgram. As previously mentioned, the exposure time of the recording medium 36 to the interference pattern of the reference and object beams 32, 34 necessary to create the holographic shadowgram is comparable to that of an ordinary photograph.

Once again, the method 44 of the present invention ensures that there is substantially no differential vibration between the reference and object beams 32, 34. As a result, the fringes of the interference pattern from the reference and object beams 32, 34 will remain substantially stable, allowing for the recording of that interference pattern in the conventional manner to produce a holographic shadowgram. Moreover, the interference pattern of the method 44 of the present invention remains stable whether or not the object 42 is vibration isolated or devoid of motion.

As previously discussed, the interference pattern of the reference and object beams 32, 34 is modified by the intervening object 42. For example, where the object 42 is opaque, the speckle pattern formed by the object beam 34 is modified by the removal of a portion of the object beam 34. It is this removal of a portion of the object beam 34 that results in the creation of a holographic "shadowgram". Where the object 42 is translucent or transparent, the change in the speckle pattern formed by the object beam 34 is caused by the index modulation, such as attenuation, of the object beam 34, rather than removal of the object beam 34.

By substantially eliminating differential vibration between the reference and object beams 32, 34, the method 44 of the present invention eliminates the stringent vibration and motion requirements of conventional holographic imaging systems. In so doing, the apparatus 10 and method 46 of the present invention allow for the holographic imaging of moving objects, such as living subjects, at any location that has firm ground and can be made reasonably dark. Moreover, due to its simple design and compact size, the apparatus 10 of the present invention is more affordable and requires less skill to properly operate than conventional holographic imaging systems, including those utilizing pulse lasers.

Thus, it is apparent that there has been provided, in accordance with the present invention, a method and apparatus for producing a holographic shadowgram of an object which fully satisfies the objects and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the following claims.

We claim:

1. An apparatus for producing a holographic shadowgram of an object, the apparatus comprising:

light source means for generating a coherent light beam;

reflector means for reflecting the coherent light beam to simultaneously produce a diffuse object beam and a coherent reference beam such that differential vibration between the object and reference beams is substantially eliminated, and for back illuminating the object with the object beam such that the object and reference beams create a substantially stable interference pattern, the reflector means comprising a rigid board having a reflective surface, the reflective surface having a diffuse portion and a non-diffuse portion wherein the diffuse portion reflects the coherent light beam to produce the diffuse object beam and the non-diffuse portion reflects the coherent light beam to produce the coherent reference beam; and recorder means for recording the interference pattern of the object and reference beams to produce the holographic shadowgram.

2. The apparatus of claim 1 wherein the light source means comprises a laser and a beam expander.

3. The apparatus of claim 2 wherein the laser comprises a CW gas laser.

4. The apparatus of claim 2 wherein the laser comprises a single mode laser diode.

5. The apparatus of claim 2 wherein the beam expander comprises an optical fiber expander.

6. The apparatus of claim 1 wherein the non-diffuse portion of the reflective surface comprises a mirror.

7. The apparatus of claim 1 wherein the diffuse portion of the reflective surface comprises construction dry wall.

8. The apparatus of claim 1 wherein the diffuse portion of the reflective surface comprises finish cut lumber having a flat white spray painted surface.

9. The apparatus of claim 1 wherein the recorder means comprises a plate and plate holder, the plate having a recording medium.

10. The apparatus of claim 9 wherein the recording medium comprises a photographic emulsion.

11. The apparatus of claim 9 wherein the recording medium comprises a photopolymer.

12. A method for producing a holographic shadowgram of an object, the method comprising the steps of:

generating a coherent light beam;

expanding the coherent light beam;

reflecting the coherent light beam off a reflector to simultaneously produce a diffuse object beam and a coherent reference beam such that differential vibration between the object and reference beams is substantially eliminated, the reflector comprising a rigid board having a reflective surface, the reflective surface having a diffuse portion and a non-diffuse portion wherein the diffuse portion reflects the coherent light beam to produce the diffuse object beam and the non-diffuse portion reflects the coherent light beam to produce the coherent reference beam;

back illuminating the object with the diffuse object beam;

creating a substantially stable interference pattern between the object and reference beams; and recording the interference pattern between the object and reference beams to produce the holographic shadowgram.

13. The method of claim 12 wherein the step of expanding the coherent light beam includes the steps of:

diverging the coherent light beam; and removing noise from the coherent light beam.

14. The method of claim 12 wherein the step of expanding the coherent light beam includes the steps of:

collimating the coherent light beam; and removing noise from the coherent light beam.

* * * * *